United States Patent [19]
Papania

[11] Patent Number: 5,273,144
[45] Date of Patent: Dec. 28, 1993

[54] ROLLER CLUTCH WITH SHIFTABLE SIDE RAIL ROLLER RETENTION

[75] Inventor: James R. Papania, Sandusky, Ohio

[73] Assignee: General Motors Corporation, Detroit, Mich.

[21] Appl. No.: 936,993

[22] Filed: Aug. 31, 1992

[51] Int. Cl.⁵ .............................................. F16D 41/06
[52] U.S. Cl. ...................................................... 192/45
[58] Field of Search ............................ 192/45; 29/418

[56] References Cited

U.S. PATENT DOCUMENTS

| | | | |
|---|---|---|---|
| 4,679,676 | 7/1987 | King et al. | 192/45 |
| 4,724,940 | 2/1988 | Lederman | 192/45 |
| 4,787,490 | 11/1988 | Lederman et al. | 192/45 |
| 4,821,856 | 4/1989 | Lederman | 192/45 |
| 4,893,702 | 1/1990 | Lederman | 192/45 |
| 4,901,834 | 2/1990 | Lederman | 192/45 |
| 4,921,084 | 5/1990 | Lederman | 192/45 |
| 4,924,980 | 5/1990 | Lederman | 192/45 |
| 4,924,981 | 5/1990 | Johnston et al. | 192/45 |
| 4,987,670 | 1/1991 | Papania | 29/451 |
| 5,046,229 | 9/1991 | Lederman | 29/418 |
| 5,048,651 | 9/1991 | Lederman | 192/45 |
| 5,056,636 | 10/1991 | Lederman | 192/45 |
| 5,176,232 | 1/1993 | Malecha | 192/45 |

*Primary Examiner*—Rodney H. Bonck
*Attorney, Agent, or Firm*—Patrick M. Griffin

[57] ABSTRACT

An overrunning roller clutch retains its rollers through the use of a pair of cage side rails that shift between a shipping position spaced separated by less than a roller length, to an operating position separated by about a roller length. A latch maintains the side rails stable in either position. In the shipping position, the roller ends are seated in aligned indents, and so are securely retained independent of the springs. The rollers are also retained in a shipping position farther back than normal, so they need not rub on the cam ramps as the clutch is installed to cam race. The pathway race hits stop members on one side rail as it is installed with a simple axial push, thereby shifting the cage side rails apart and freeing the rollers for operation.

3 Claims, 6 Drawing Sheets

ROLLER CLUTCH WITH SHIFTABLE SIDE RAIL ROLLER RETENTION

This invention relates to roller clutches in general, and specifically to a roller clutch with a cage having axially shiftable side rails designed to provide secure roller shipping retention, as well as simplified assembly and installation.

BACKGROUND OF THE INVENTION

Until a few years ago, overrunning roller clutches depended exclusively upon the compression force of the roller energizing springs to retain the rollers in the cage during shipping and handling. In such conventional designs, the rollers are pushed against cage crossbars located in front of the rollers by the compression of the energizing springs between the rollers and cage crossbars located behind the rollers. To install such a clutch, the clutch cage and retained rollers are first pushed axially onto the cam race, and then rotated slightly so that reaction ears on the cage lock to the cam race. These may be seen at 40A and 40B in co-assigned U.S. Pat. No. 4,679,676 to King et al. Then, the pathway race is added by with an axial push and twist, the so called "ringing on" method, which shifts the rollers back along the cam race cam ramps and away from the cage crossbars, compressing the springs further. There are two great drawbacks to this system. The most serious is was the fact that the energizing springs aren't particularly strong, even in their most highly compressed state. They are even less strong in their less compressed, shipping state, and roller retention is accordingly weak. Furthermore, roller travel, the back and forth rolling of a roller on its cam ramp that occurs during clutch operation, is limited by the proximity of the cage crossbars in front of the rollers, which must be fairly close to the rollers.

Newer designs have totally divorced roller retention from the compression force of the energizing springs. One approach, shown in co-assigned U.S. Pat. No. 4,724,940 to Lederman, traps each roller between the end of the spring and a crossbar through the use of a releasable spring latch. The spring latch is released when the roller is shifted back during the of the pathway race. Yet another approach does not use the spring in any way to retain the roller, as shown in co-assigned U.S. Pat. No. 4,821,856 to Lederman. Instead, dedicated roller control cars hold each roller, and the cars travel back and forth, with the rollers, in tracks on the cage side rails. Still another approach, shown in co-assigned U.S. Pat. No. 4,901,834 to Lederman, uses resilient projections on the side cage side rails that fit into end depressions on the rollers to hold the rollers during shipping. The roller latches are released by the same ringing in motion that releases the spring latches in U.S. Pat. No. 4,724,940.

SUMMARY OF THE INVENTION

The invention provides still another approach to spring independent roller shipping retention. The cage is designed with special axially shiftable side rails that hold the rollers securely during shipping, but which are pulled slightly apart to free the roller in operation. It is not necessary that the pathway race be simultaneously twisted as it is installed.

In the preferred embodiment disclosed, a pair of cage side rails are held together by an axially acting latch with two stable positions. The first, shipping, position holds the side rails closer together than the length of the rollers. The roller ends sit in close fitting indents in the side rails, and are securely retained, as are the compressed springs. There is no need for any cage crossbars to be close in front of the rollers, nor is it necessary that the rollers be located in a shipping position that is farther forward of their ultimate operating position on the cam ramps. When the cage is installed to the cam race, the cage side rails remain closely spaced, holding the rollers. When the pathway race is pushed axially into place, its axial motion catches one of the side rails and shifts it away from the other, moving the latch to its second stable position. The roller ends are freed, and can travel freely, unrestricted by any part of the cage.

DESCRIPTION OF THE PREFERRED EMBODIMENT

These and other objects and features of the invention will appear from the following written description, and from the drawings, in which.

Figures 13, 14, 15, 16, 17:
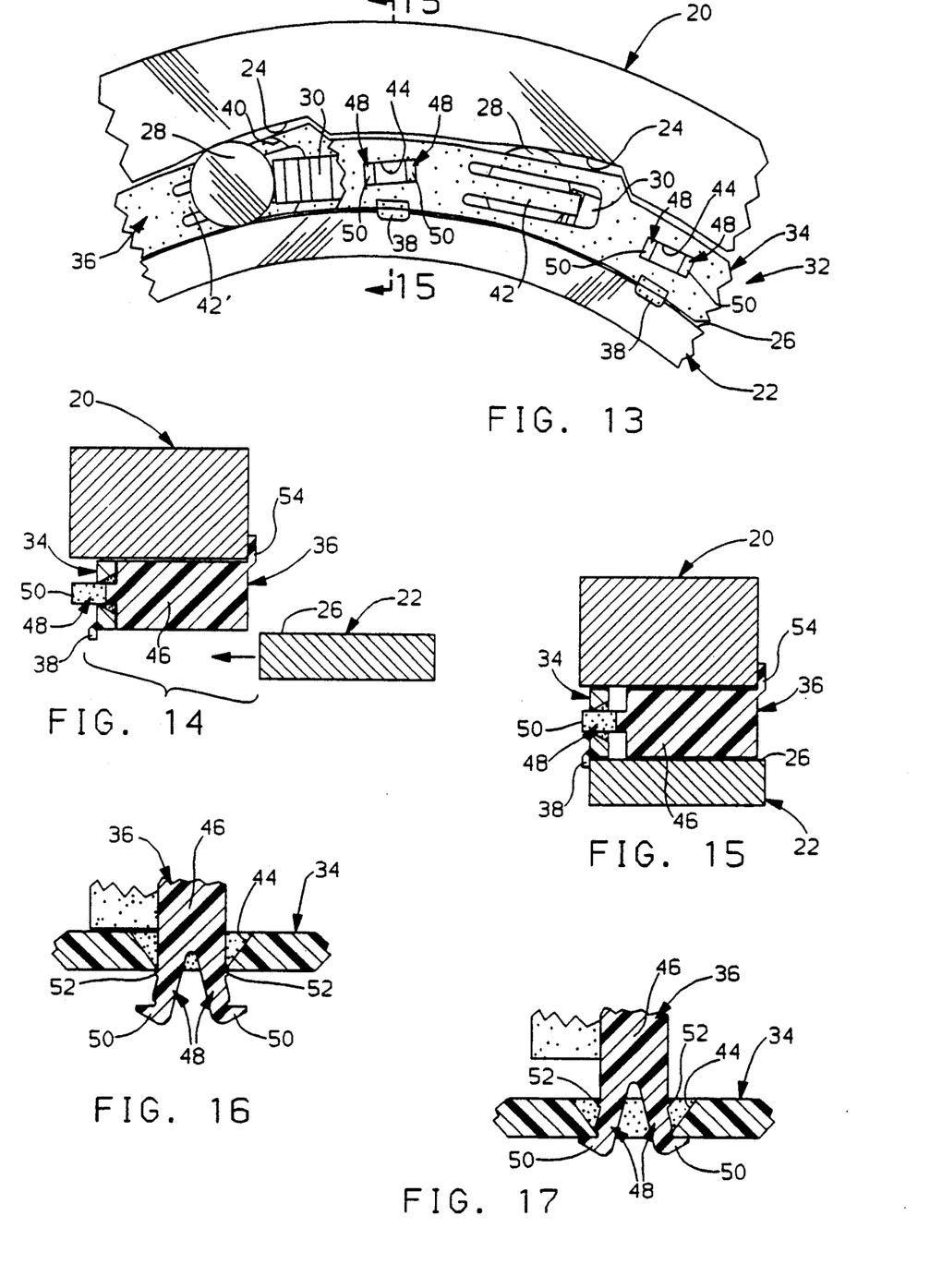
FIG. 13 shows the pathway race installed, with the rollers shifted to operating position.
FIG. 14 is a cross section taken along the line 14—14 of FIG. 12, and showing the pathway race being moved into position.
FIG. 15 is a cross section taken along the line 15—15 of FIG. 13.
FIG. 16 is an enlargement of part of FIG. 10, showing just the latch in its shipping position.
FIG. 17 is an enlargement of the latch from FIG. 11, showing the operative position.

Referring first to FIGS. 13, a pair of races include an outer cam race, indicated generally at (20), and an inner pathway race, indicated generally at (22). Cam race (20) is machined with an evenly spaced series of sloped cam ramps (24), each of which defines a roller wedge pocket in cooperation with the the coaxial cylindrical pathway (26) of pathway race (22). In operation, a cylindrical roller (28) of predetermined diameter and end-to-end length is biased to the left by a compressed accordion type energizing spring (30). Spring (30) maintains a roller (28) in a ready position contacting both pathway (26) and the approximate center of a respective cam ramp (24), so that it can quickly jam between the races (20) and (22) and lock them up if they attempt to counter rotate. Spring (30) has a predetermined uncompressed or free length before it is installed, and a shorter operational length as it acts to keep a roller (28) in ready position during clutch operation. During operation, however, the races (20) and (22) do not run perfectly coaxial. The wedge narrows and widens with every rotation, and each roller (28) must continually roll or "travel" back or forth on its own ramp (24) in order to stay in lock up ready position, at the narrow end of the wedge, so the operational length of spring (30) is an average length, not a constant. When the pathway race (22) is installed, it is pushed axially over and within cam race (20). However, because the rollers (28) are retained in a different manner, it need not be given a simultaneous twist to the left, as it would in a conventional installation, as will be described below.

Figure 1:
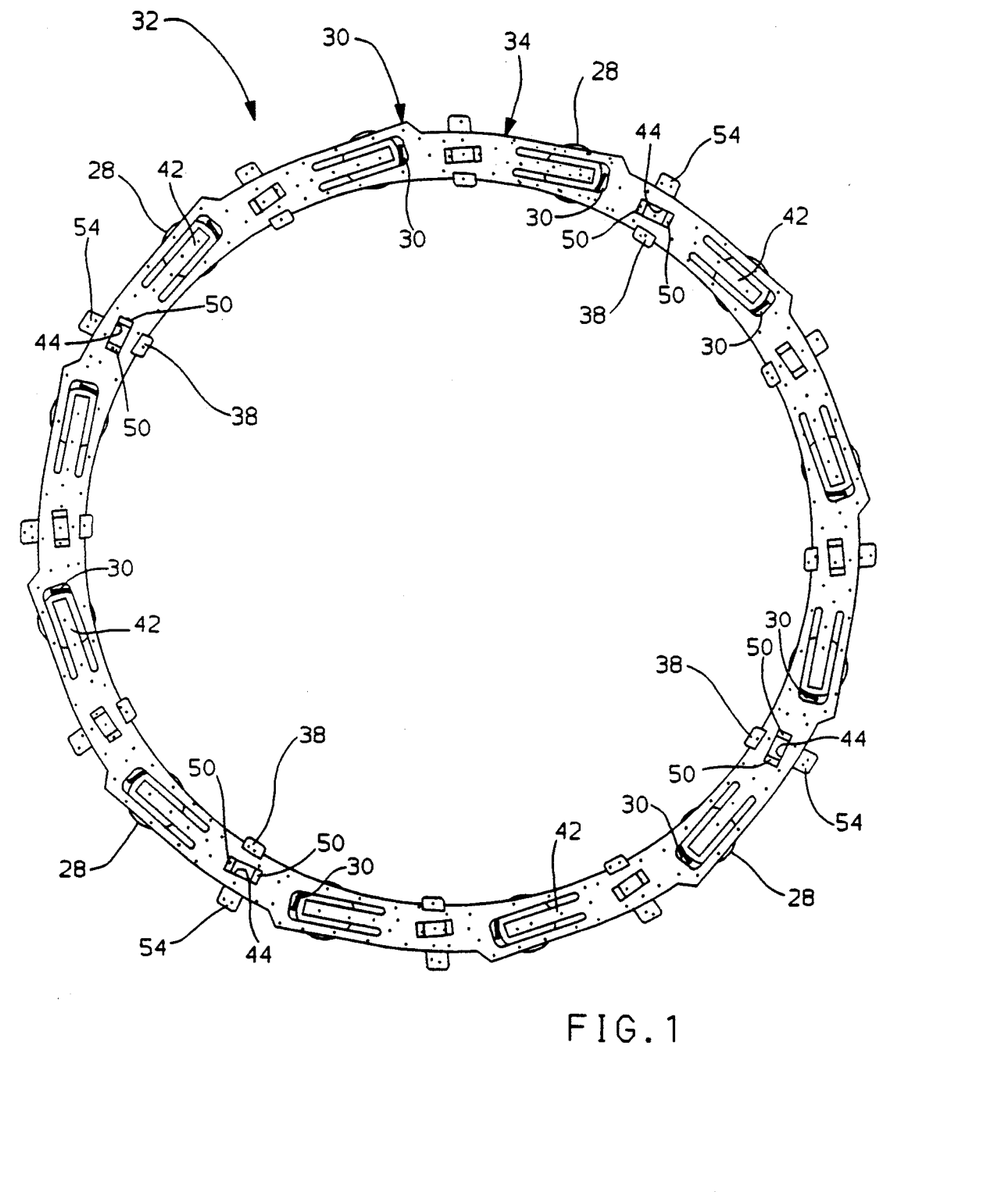
FIG. 1 is an axial view of one side of a preferred embodiment of the invention prior to installation.
Figure 12:
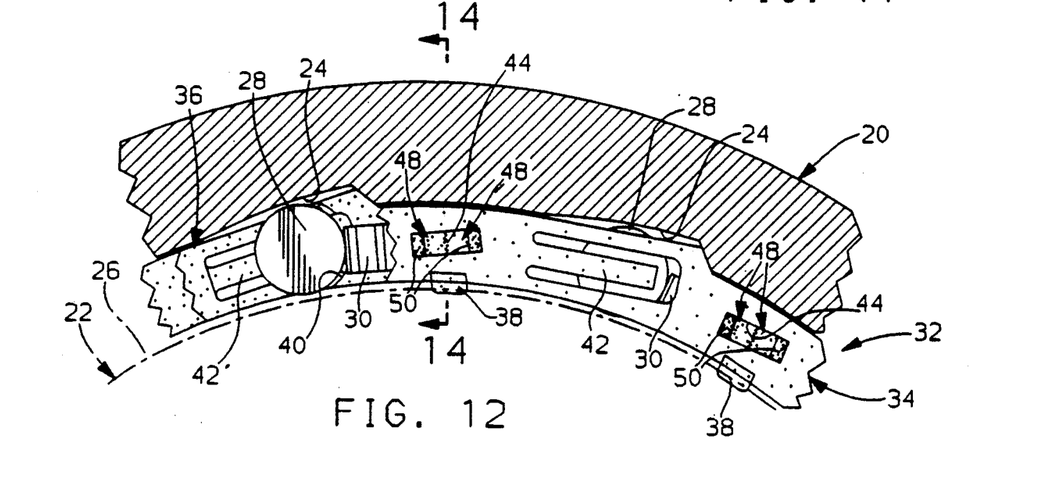
FIG. 12 is a view of a portion of the clutch installed to the cam race before installation of the pathway race.

Referring next to FIGS. 1 and 12, a preferred embodiment of the overrunning roller clutch of the invention is indicated generally at (32). FIG. 1 shows the clutch (32) in its preinstallation, shipping condition, while FIG. 12 shows it installed to the cam race (20). Clutch (32) retains its rollers (28) and springs (30) in a cage comprised of two axially spaced side rails, a lead side rail indicated generally at (34), and a trailing side rail indicated generally at (36). The side rails are so named because the lead side rail (34) moves over the cam race (20) first during installation. Details of the side rails (34), (36) and their operation are described in detail below. However, it is significant to note in FIG. 12 that each roller (28) is located quite far toward the wide end of, but not directly touching, the cam ramp (24). This difference is relevant to the way in which clutch (32) is assembled and installed.

Figure 2:
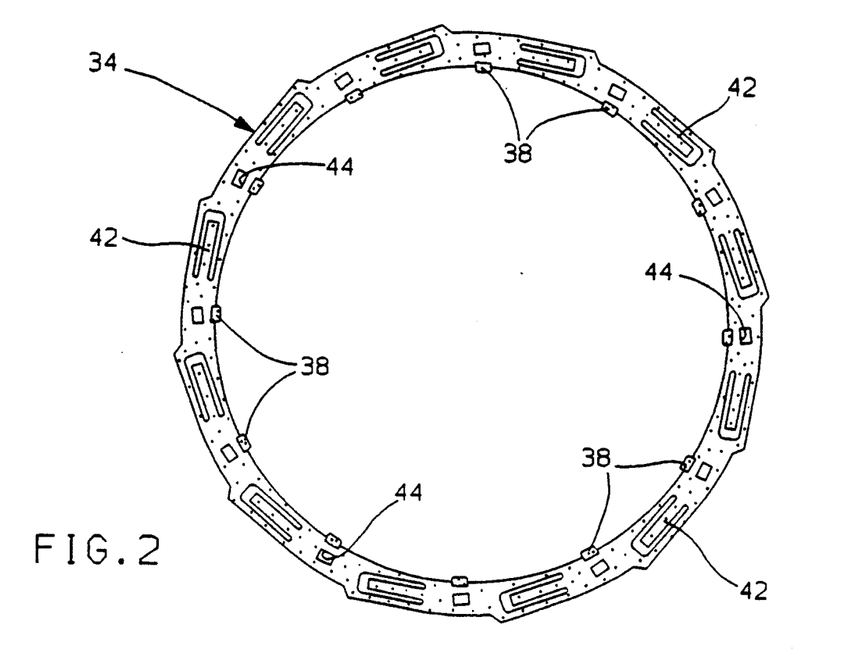
FIG. 2 is an axial view of the outer surface of one cage side rail alone, the lead side rail which moves in first during installation.
Figure 3:
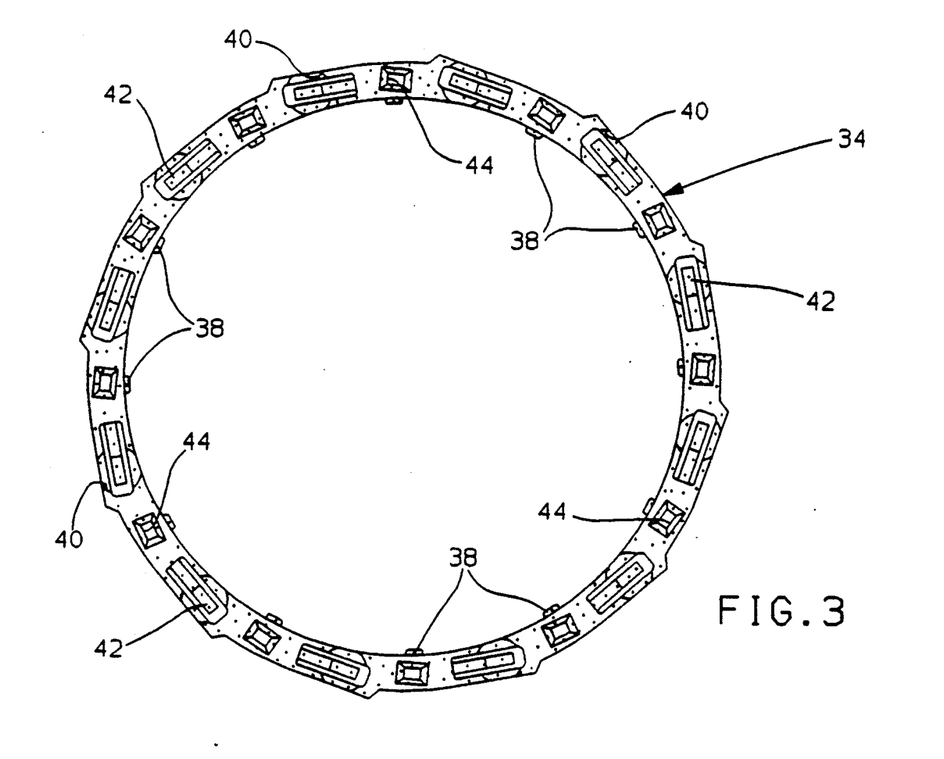
FIG. 3 is an axial view of the inner surface of the lead cage side rail.
Figure 4:
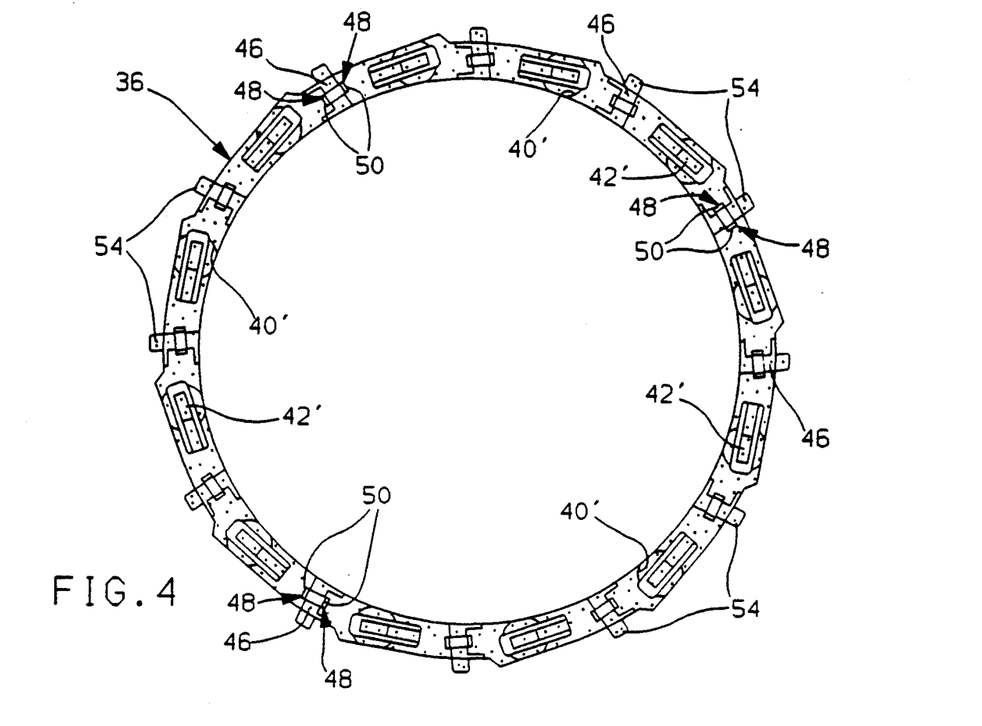
FIG. 4 is an axial view of the inner surface of the other cage side rail, the trailing side rail which moves in last during installation.
Figure 5:
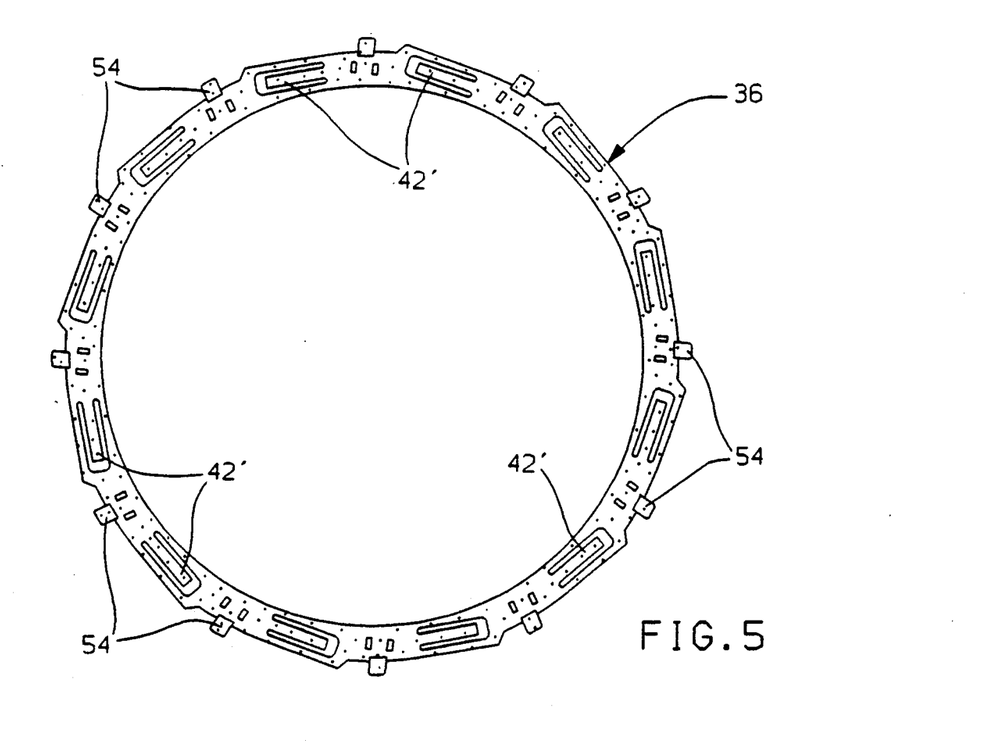
FIG. 5 is an axial view of the outer surface of the trailing cage side rail.
Figures 6, 7, 8:
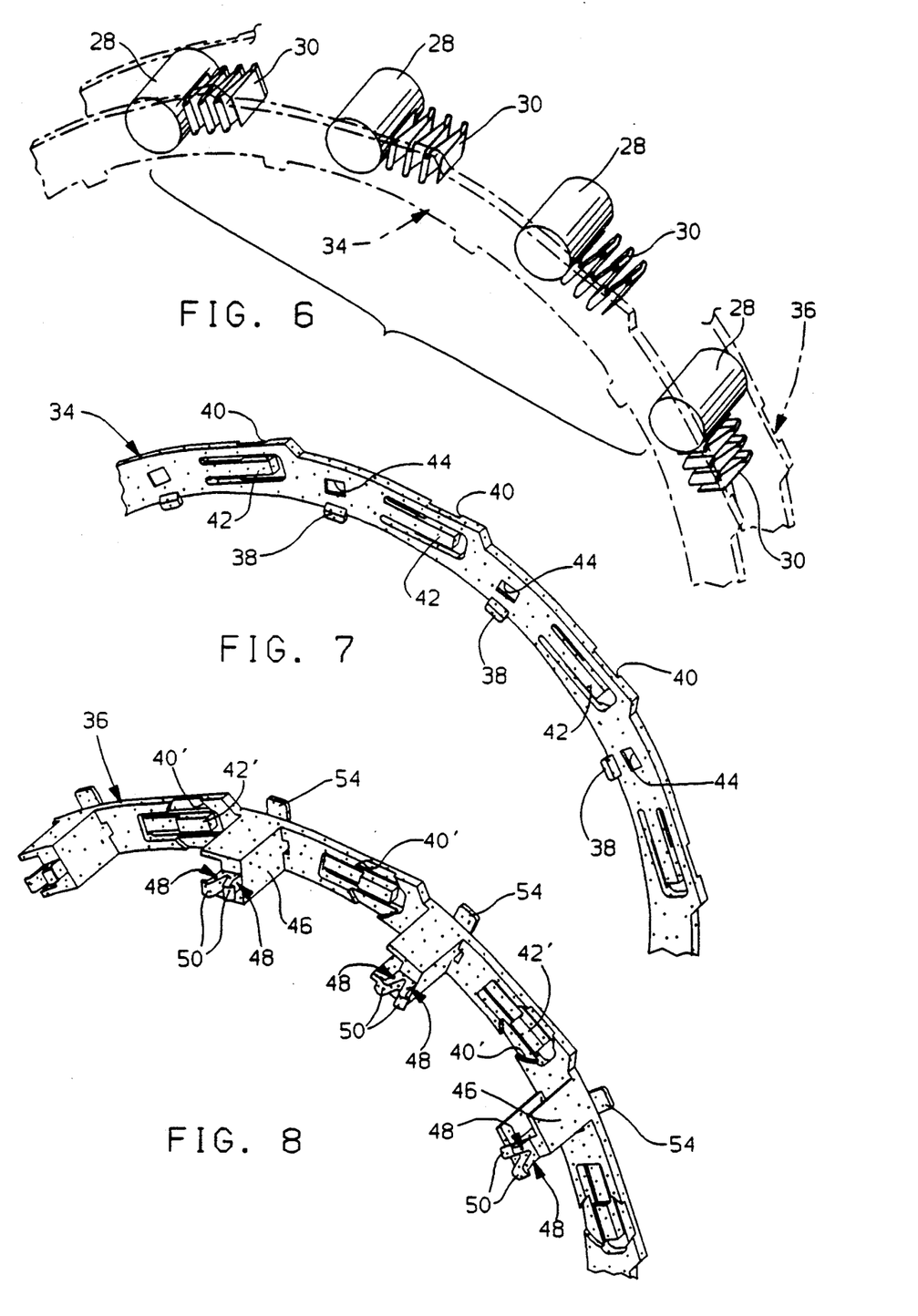
FIG. 6 is a perspective view of just the rollers and springs disembodied from the clutch.
FIG. 7 is a perspective view of a portion of the lead side rail.
FIG. 8 is a perspective view of a portion of the trailing side rail.

Referring next to FIGS. 1 through 3, and to FIG. 7, the lead side rail (34) is generally annular in shape, with a serrated outer edge that fits closely over the cam ramps (24). This is generally true for any clutch cage side rail. Instead of radially outwardly extending tabs on its outer edge, as in U.S. Pat. No. 4,679,676 noted above, lead side rail (34) has a spaced series of radially inwardly extending tabs (38) on its inner edge, which serve a different purpose. The inner surface of lead side rail (34) is basically flat, but for a plurality of integrally molded, evenly spaced circular concavities or indents (40), best seen in FIG. 3, each of which is close to the diameter of a roller (28). Each indent (40) is accompanied by a cantilevered arm (42) molded integrally through the lead side rail (34). In its free molded, unstressed state, the free end of each arm (42) lies flush to the inner surface of lead side rail (34), effectively filling the center of a respective indent (40). Between each adjacent pair of indents (40) is an open socket (44).

Referring next to FIGS. 4, 5, 8 and 16, trailing side rail (36) is similar in shape to lead side rail (34), having a similarly serrated outer edge, and identically placed indents and arms, which are given the same number with a prime. Molded in the same relative location as the sockets (44) is a plurality of axially extending cross bars (46), each of which is slightly shorter than the length of a roller (28). Each crossbar (46) is also deliberately closer to the indent 40' located in front of it than the operational length of a spring (30), that is, the length of a spring (30) that will maintain the roller (28) engaged with a respective cam ramp (24). The same is true for each indent (40), since they match and align exactly with the indents (40'). This serves a purpose described below. Molded at the end of each cross bar (46) is a pair of generally V-shaped latching fingers (48), which are spread, in their free molded state, farther apart than the width of the sockets (44). As best seen in FIG. 16, the outer surface of each finger (48) includes a pair of latching surfaces, a hook (50) at the end, and a rib (52) axially inset from hook (50). Trailing side rail (36) also has a number of radially extending stop tabs, but on its outer edge, indicated at (54). These act in cooperation with the tabs (38) on the lead side rail (34), as will appear below.

Figure 9:
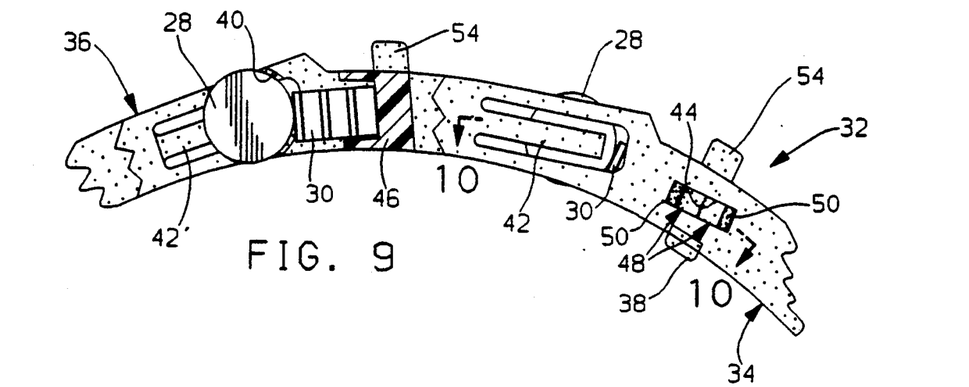
FIG. 9 is an axial view of a portion of the complete clutch with part of the trailing side rail broken away to reveal a roller in its shipping position.
Figure 10:
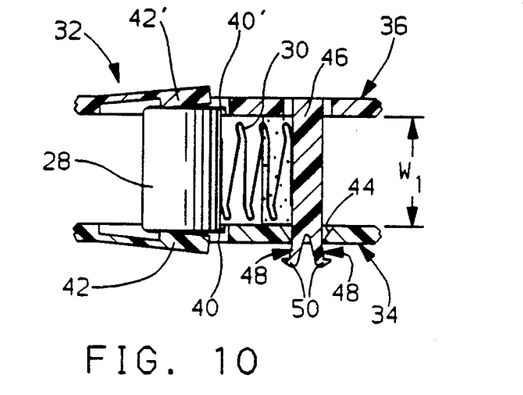
FIG. 10 is a cross section taken along the line 10—10 of FIG. 9.

Referring next to FIGS. 9, 10 and 16, clutch (32) is assembled significantly differently from a conventional clutch. Typically, the clutch cage would have a plurality of pockets formed by adjacent pairs of cage crossbars, between which a roller and spring would be inserted one pair at a time, in a radially inward direction. Here, a more efficient and less complex assembly process is feasible. As best seen in FIG. 9, the end of each roller (28) can be inserted, one at a time or all at once, axially into an indent (40') in the trailing side rail (36). In fact, because of the presence of the arms (42'), some kind of a jig or fixture would be advantageous to pry and hold the arms (42') out temporarily, and open up the indents (40') to allow the easy insertion of the ends of the rollers (28). A spring (30) is inserted axially between each roller (28) and crossbar (46). Because of the spacing of the indents (40), (40') from the crossbars (46) described above, the springs (30) are put under significant compression, which is more than sufficient to self retain the light weight of the springs (30). Then, with the rollers (28) and springs (30) loaded in place, the lead side rail (34) would be aligned with and pushed axially toward the trailing side rail (36), causing each pair of latch fingers (48) to close up as the hooks (50) ride past the chamfered edges of the sockets (44). Lead side rail (34) is pushed as far as possible, until the ends of the crossbars (46) hit its inner surface, and the other ends of the rollers (28) seat in its matching indents (40). Simultaneously, the ribs (52) grab the opposite edges of the socket (44), as best seen in FIGS. 10 and 16, maintaining the side rails (34), (36) in a so called shipping position where they are spaced apart by a width $W_1$ that is less than the length of the rollers (28). This keeps the ends of the rollers (28) all firmly seated in the opposed pairs of indents (40), (40'), and even vigorous shaking will not dislodge them. The compression of the springs (30), even though greater than in a conventional clutch, need not act to retain the rollers (28). The opposed pairs of arms (42), (42') are flexed outwardly to an extent, ready to flex back if released. It will also be noted that the location of the rollers (28) relative to the crossbars (46) is significantly different than in a clutch that uses spring compression for roller retention. The rollers (28) are closer to the crossbars (46) located behind them, and farther from the crossbars (46) in front. In addition, the spring (30) is actually compressed more than it ultimately will be in operation, which means that it actually retains itself better than it would in a conventional clutch, where it would be compressed less during shipping than after installation.

Referring next to FIGS. (10), (12), (14), and (16), the first step in the installation of clutch (32) is illustrated. Clutch (32) is simply pushed axially onto the cam race (20). The lead side rail (34) moves on first, stopping when the trailing side rail tabs (54) hit the back face of cam race (20). The rollers (28) remain strongly secured at this point, because nothing has yet shifted the side rails (34) and (36) back apart. As best seen in FIG. 12, because of the fact that the crossbars (46) are closer to the aligned pairs of indents (40), (40') than the so called operational length of the springs (30), the rollers (28) are thereby located significantly farther back on the cam ramps (24), more toward the wide end of the wedge, and actually radially spaced therefrom to a small degree, whereas they would be on the cam ramps (24) conventionally. Therefore, it is easier to push clutch (32) onto cam race (20), since the rollers (28) don't rub on the cam ramps (24). Furthermore, the rollers (28) are located clear of the circle where pathway (26) is ultimately located, shown in dotted lines. In a clutch in which the rollers are retained by spring force, the rollers (28) would be located inside the dotted line circle. Consequently, the pathway race (22) is also easier to install, as will appear next.

Figure 11:
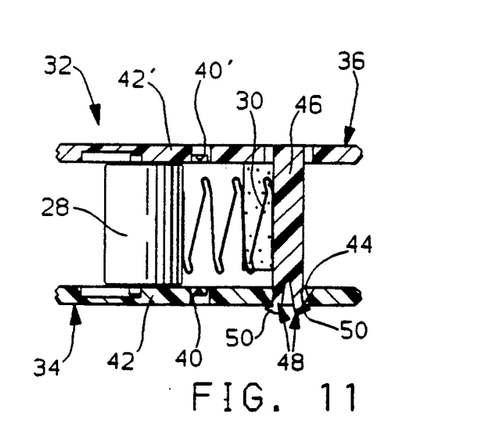
FIG. 11 is a view like FIG. 10, but showing the roller shifted to its operating position.

Referring next to FIGS. 11, 13 through 15 and 17, the next step in the installation of clutch (32) is illustrated. Pathway race (22) is simply pushed axially in, from the FIG. 14 to the FIG. 15 position, until the two clutch races (20) and (22) are flush and aligned. This is a much simpler process than the conventional ringing in process, because the rollers (28) do not hit the pathway race (20), which also does not have to be twisted so as to move the rollers (28) back up the cam ramps (24). Instead, the edge or face of the pathway race (20) hits the lead side rail tabs (38), which pushes lead side rail (34) away from (36). Simultaneously, the edges of the sockets (44) are pushed past the ribs (52) and along the outer surfaces of the latch fingers (48), pushing them together until the outer surface of the lead side rail (34) contacts the hooks (50). This is also a stable position, since the bight of the hooks is notched slightly to catch the edges of the sockets (44). The latch is actually stronger in the operating than in the shipping position, because the fingers (48) are compressed closer together. Therefore, the side rails (34) and (36) are secured in a so called operating position where, as best illustrated in FIG. 15, that are spaced apart by just slightly more than the length of a roller (28). As seen in FIG. 11, the arms (42) and (42') spring back flush with the inner surfaces of the side rails (34) and (36), and the rollers (28) move forward on the cam ramps (24) to the narrow end of the wedge as the springs (30) expand, but still remain under some residual compression to keep the rollers (28) in ready position. This is exactly the opposite of what happens when a pathway race is rung on, in which case the rollers (28) would be moved back, and the springs (30) would compress more. Once freed, the rollers (28) are free to travel back and forth on the cam ramps (24) without obstruction, as there is no crossbar close in front, and the indents (40), (40') are filled by the ends of the arms (42), (42'), so as not to catch the rollers (28) in operation.

In conclusion, assembly, shipping and handling, installation, and operation are all improved as compared to a conventional roller clutch that retains the rollers by spring compression. Even as compared to some designs that retain the rollers with a releasable spring latch, installation is simplified, since the pathway race (22) can be installed with a simple axial push, without contacting the rollers, and needs no twist. Variations in the preferred embodiment could be made. If the indents (40), (40') were located closer to the cross bars (46) behind the rollers (28), so that the rollers (28) moved even farther forward when released, it is possible that the rollers (28) would not, during ordinary operation, move back far enough to conflict with the indents (40). In that case, the resilient arms (42) would not be necessary to refill the indents (40), (40)' after the side rails (34), (36) had been shifted apart. The arms (42), (42') are not difficult to provide, however, being integrally molded with the side rails (34), (36), and they do allow the roller travel path to intersect with the indents (40), (40') without incident. The axial separation force for the side rails (34) and (36) could be provided by some other means, independently of the installation of the pathway race (22). The tabs (38) are particularly useful, however, since they efficiently and simply translate the force of installing the pathway race (22) into the side rail shifting force. Indeed, because of the novel shipping position of the rollers (28) at the wide end of the wedge, where they contact neither the cam ramps (24) nor the pathway (26), the order of race installation is not locked in. The pathway race (22) could be installed first, followed by the cam race (22) hitting the tabs (54) to apply the shifting force. Or, the races (20), (22) could be aligned first, and the clutch (32), without the tabs (54), could be pushed into the annular space between them. A different latch means could be used, so long as it had two stable position, but the fingers (48) work very well, being easy to mold, and since they latch even more strongly in the operating position. The indents (40), (40') could have any shape, square for example, so long as their size was basically equal to the diameter of a roller (28). Therefore, it will be understood that it is not intended to limit the invention to just the embodiment disclosed.

The embodiments of the invention in which an exclusive property of privilege is claimed are defined as follows:

1. An overrunning clutch of the type having a plurality of rollers of predetermined diameter and end-to-end length and which is installed over a cam race having an equal plurality of cam ramps, said clutch comprising, a first cage side rail sized to fit axially over said cam race, said first side rail also having an equal plurality of concavities therein which are substantially equal in size to a roller diameter, a second cage side rail sized to fit axially over said cam race and having an equal plurality of same size concavities aligned with those in said first cage side rail, and, a two position, axially activated latch means engaged between said side rails to maintain them axially spaced, said latch means having a first stable position in which said side rails are held in a shipping position spaced apart by less than said roller length, and a second stable position in which said side rails are spaced apart in an operating position by substantially said roller length, whereby, when said side rails are in said shipping position, the ends of said rollers are held securely in said concavities, after which said second cage side rail is shifted to its operating position to free said rollers.

2. An overrunning clutch of the type having a plurality of rollers of predetermined diameter and end-to-end length and compression energizing springs having a predetermined operating length, and which is installed between a cam race having an equal plurality of cam ramps and a pathway race, and in which said clutch is installed to said cam race by pushing said clutch axially over said cam ramps, said clutch comprising, a first cage side rail sized to fit axially over said cam race, said first side rail also having an equal plurality of axially extending crossbars and concavities therein which are substantially equal in size to a roller diameter and each of which is circumferentially spaced from a respective crossbar by less than said spring operating length, a second cage side rail sized to fit axially over said cam race in one axial direction and having an equal plurality of same size concavities aligned with those in said first cage side rail, and, a two position, axially activated latch means engaged between said crossbars and said second cage side rail to maintain said side rails axially spaced, said latch means having a first stable position in which said side rails are held in a shipping position spaced apart by less than said roller length, and a second stable position in which said side rails are spaced apart in an operating position by substantially said roller length, whereby, when said side rails are in said shipping position, the ends of said rollers are held securely in said concavities with said energizing springs compressed between said rollers and crossbars, so that said clutch may be installed easily to said cam race without said rollers contacting said cam ramps, by virtue of the location of said crossbars, after which said second cage side rail can be shifted to its operating position to free said rollers and springs in operation.

3. An overrunning clutch of the type having a plurality of rollers of predetermined diameter and end-to-end length, a which is installed between a cam race having an equal plurality of cam ramps and a pathway race, and in which said clutch is installed first by pushing it axially over said cam race after which said pathway race is assembled by moving it axially into alignment with said cam race and clutch, said clutch comprising, a first cage side rail sized to fit axially over said cam race, said first side rail also having an equal plurality of concavities therein which are substantially equal in size to a roller diameter, a second cage side rail sized to fit axially over said cam race in one axial direction and having an equal plurality of same size concavities aligned with those in said first cage side rail, said second cage side rail further having a stop member thereon engageable by said pathway race as it is installed to apply an axial force thereto, and, a two position, axially activated latch means engaged between said side rails to maintain said side rails axially spaced, said latch means having a first stable position in which said side rails are held in a shipping position spaced apart by less than said roller length, and a second stable position in which said side rails are spaced apart in an operating position by substantially said roller length, whereby, when said side rails are in said shipping position, the ends of said rollers are held securely in aid concavities, so that, after said clutch is installed to said cam race, said pathway race is installed and contacts said second cage side rail stop member, thereby shifting said second cage side rail to its operating position to free said rollers.

* * * * *